(12) United States Patent
Li

(10) Patent No.: US 7,618,158 B2
(45) Date of Patent: Nov. 17, 2009

(54) ILLUMINATION SYSTEM USING FILAMENT LAMPS

(75) Inventor: Kenneth K. Li, Arcadia, CA (US)

(73) Assignee: Wavien, Inc., Valencia, CA (US)

( * ) Notice: Subject to any disclaimer, the term of this patent is extended or adjusted under 35 U.S.C. 154(b) by 25 days.

(21) Appl. No.: 11/386,328

(22) Filed: Mar. 22, 2006

(65) Prior Publication Data

US 2006/0227557 A1 Oct. 12, 2006

Related U.S. Application Data

(63) Continuation of application No. 11/208,142, filed on Aug. 19, 2005, now abandoned, which is a continuation of application No. 10/078,256, filed on Feb. 20, 2002, now Pat. No. 6,955,452.

(60) Provisional application No. 60/269,888, filed on Feb. 21, 2001.

(51) Int. Cl.
*F21V 7/09* (2006.01)
(52) U.S. Cl. .................. 362/296.01; 362/297; 362/298; 362/551; 362/560
(58) Field of Classification Search .................. 362/296, 362/297, 298, 341, 346, 551, 560, 302
See application file for complete search history.

(56) References Cited

U.S. PATENT DOCUMENTS

| | | | | |
|---|---|---|---|---|
| 1,913,517 A | * | 6/1933 | Smith et al. ................... 362/217 |
| 2,001,528 A | * | 5/1935 | De Groot et al. ............... 313/25 |
| 2,496,374 A | * | 2/1950 | Boucher et al. .............. 313/597 |
| 3,247,416 A | * | 4/1966 | Yamashita .................... 313/110 |
| 3,644,730 A | * | 2/1972 | Ogle et al. ................... 362/345 |
| 3,772,506 A | | 11/1973 | Junginger | |
| 3,986,767 A | | 10/1976 | Rexer et al. | |
| 4,020,336 A | * | 4/1977 | Linder ......................... 362/19 |
| 4,149,227 A | | 4/1979 | Dorman | |
| 4,357,075 A | | 11/1982 | Hunter | |
| 4,473,295 A | | 9/1984 | Doyle | |
| 4,519,266 A | | 5/1985 | Reinecke | |
| 4,608,622 A | | 8/1986 | Gonser | |
| 4,634,276 A | | 1/1987 | Sharpe | |
| 4,757,431 A | | 7/1988 | Cross et al. | |
| RE32,912 E | | 4/1989 | Doyle | |
| 4,897,771 A | | 1/1990 | Parker | |

(Continued)

FOREIGN PATENT DOCUMENTS

EP 0401351 A1 9/1993

(Continued)

*Primary Examiner*—Sharon E Payne
(74) *Attorney, Agent, or Firm*—Fulbright & Jaworski LLP

(57) ABSTRACT

An illumination system using filament lamps including a filament lamp, a reflector having a first and second focal points, the filament lamp disposed proximate to the first focal point of the reflector to emit rays of electromagnetic radiation that reflect from the reflector and converge substantially at the second focal point, wherein a portion of the electromagnetic radiation emitted by the filament lamp impinges directly on the reflector and a portion of the electromagnetic radiation does not impinge directly on the reflector and wherein the system further includes an additional reflector constructed and arranged to reflect at least part of the portion of the electromagnetic radiation that does not impinge directly on the reflector toward the reflector through the first focal point of the reflector.

11 Claims, 9 Drawing Sheets

U.S. PATENT DOCUMENTS

| | | |
|---|---|---|
| 4,956,759 A | 9/1990 | Goldenberg et al. |
| 4,957,759 A | 9/1990 | Swartzel et al. |
| 5,191,393 A | 3/1993 | Hignette et al. |
| 5,414,600 A | 5/1995 | Strobl et al. |
| 5,430,634 A | 7/1995 | Baker et al. |
| 5,707,131 A | 1/1998 | Li |
| 5,777,809 A | 7/1998 | Yamamoto et al. |
| 5,803,579 A | 9/1998 | Turnbull et al. |
| 5,873,646 A | 2/1999 | Fjaestad et al. |
| 5,900,973 A | 5/1999 | Marcellin-Diborn et al. |
| 5,986,792 A | 11/1999 | Rizkin et al. |
| 6,227,682 B1 | 5/2001 | Li |
| 6,356,700 B1 | 3/2002 | Strobl |
| 6,616,304 B2 | 9/2003 | Li |
| 6,619,820 B2 | 9/2003 | Li |
| 6,955,452 B2 * | 10/2005 | Li .............................. 362/297 |

FOREIGN PATENT DOCUMENTS

| | | |
|---|---|---|
| JP | 6-78906 | 11/1994 |
| JP | 2000-067623 | 3/2000 |
| WO | WO 00/22344 | 4/2000 |
| WO | WO-0102774 A1 | 1/2001 |
| WO | WO-0173487 A2 | 10/2001 |

* cited by examiner

ILLUMINATION SYSTEM USING FILAMENT LAMPS

CROSS-REFERENCE TO RELATED APPLICATIONS

This application is a continuation application of U.S. Ser. No. 11/208,142 filed Aug. 19, 2005 now abandoned, which is a continuation application of U.S. Ser. No. 10/078,256 filed Feb. 20, 2002 now U.S. Pat. No. 6,955,452, which claims priority to Provisional Application Ser. No. 60/269,888 filed Feb. 21, 2001, the disclosure of which is incorporated by reference.

BACKGROUND OF THE INVENTION

1. Field of the Invention

The invention relates to illumination systems using filament lamps.

2. Description of the Related Art

On-axis reflector systems, such as e.g. elliptical and parabolic reflector systems, are often used in e.g. fiber optic illuminators, projection engines for large screen displays, and projection monitors. Such on-axis reflector systems may be used to couple electromagnetic radiation from a source into small targets. On-axis reflector systems, however, may magnify electromagnetic radiation emitted by the source in different amounts at different angles. The differences in magnification are exacerbated by the size of the light source. An ideal source for such an on-axis system is thus a point source.

Arc lamps are often used as sources of electromagnetic radiation in such systems rather than, e.g. filament lamps, because they are small enough to approximate a point source. Arc lamps are smaller than, e.g. filament lamps, because a, e.g. tungsten filament inside the filament lamp is generally longer than an arc of a comparable short arc lamp. If filament lamps were used in an on-axis reflector system, the image of the filament would be magnified differently for different angles of emitted radiation, resulting in a large fuzzy spot. Filament lamps are thus very inefficient for coupling light into small targets. Filament lamps, however, are generally less expensive, and last longer, than arc lamps. Filament lamps are thus generally used in on-axis reflector systems only if efficiency is not an issue. In applications where efficiency is not an issue a filament lamp such as, e.g. a large wattage lamp may be used.

There thus exists a need for a coupling system that can couple electro-magnetic radiation from a filament lamp at high efficiency into a small target.

SUMMARY OF THE INVENTION

In one aspect, the invention consists of an illumination system using filament lamps including a filament lamp, a reflector having a first and second focal points, the filament lamp disposed proximate to the first focal point of the reflector to emit rays of electromagnetic radiation that reflect from the reflector and converge substantially at the second focal point, wherein a portion of the electromagnetic radiation emitted by the filament lamp impinges directly on the reflector and a portion of the electromagnetic radiation does not impinge directly on the reflector and wherein the system further comprises an additional reflector constructed and arranged to reflect at least part of the portion of the electromagnetic radiation that does not impinge directly on the reflector toward the reflector through the first focal point of the reflector.

In another aspect, the invention consists of a method of illumination including steps of positioning a filament lamp at a first focal point of a reflector, producing rays of radiation by the filament lamp, reflecting a portion of the rays of radiation by the reflector toward a second focal point of the second reflector, converging the rays of radiation at the second focal point of the reflector, reflecting at least part of a portion of the rays of radiation that do not impinge directly on the reflector toward the reflector through the first focal point of the reflector, positioning a output light pipe having an input surface and an output surface so the input surface is substantially proximate to the second focal point, collecting the rays of radiation at the input surface, passing the rays of radiation through the output light pipe, and outputting rays of radiation from the output surface of the output light pipe.

DETAILED DESCRIPTIONS OF THE PREFERRED EMBODIMENTS

Figure 1:
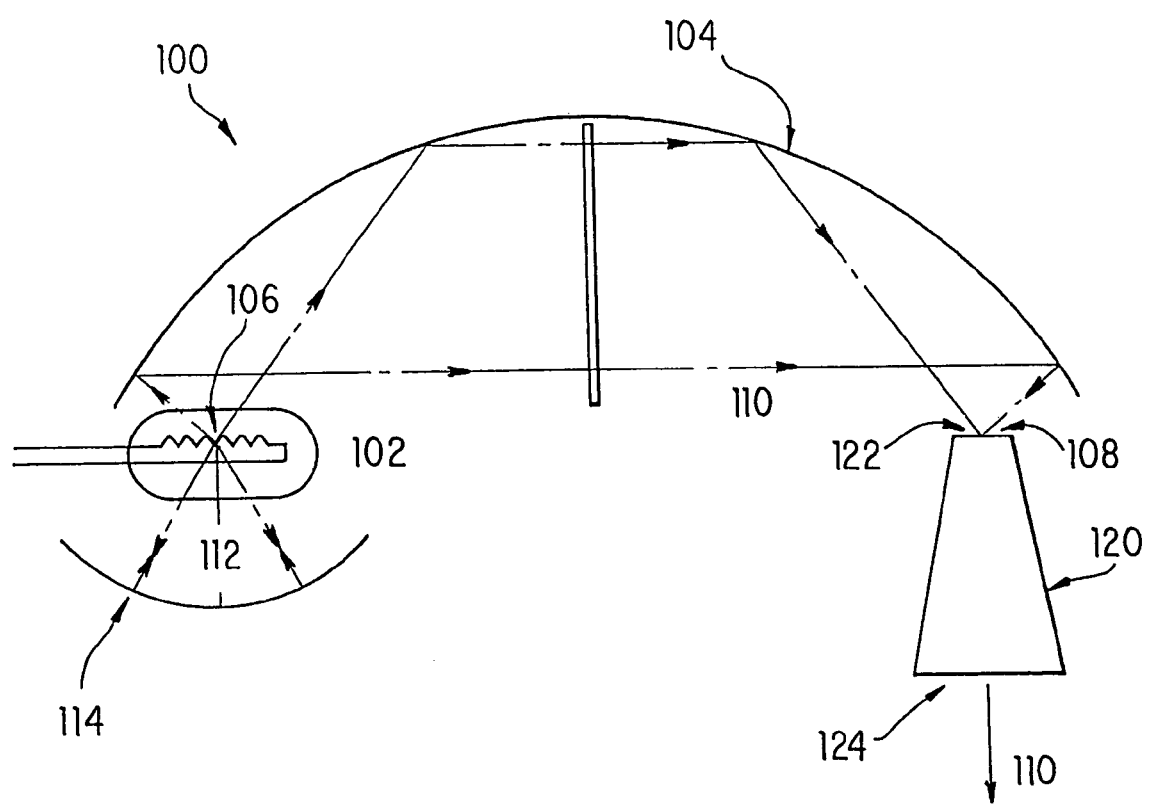
FIG. 1 is a schematic diagram of an illumination system according to one embodiment of the invention.

In a first embodiment of the illumination system 100 using filament lamps, shown in FIG. 1, a filament lamp 102 may be disposed proximate to a first focal point 106 of a reflector 104 having a first and second focal points 106, 108. Filament lamp 102 may be, e.g. a tungsten filament lamp. Filament lamp 102 emits rays of electromagnetic radiation 110. Some of rays of electromagnetic radiation 110 are reflected by reflector 104 and converge substantially at second focal point 108.

Although some of rays of electromagnetic radiation 110 emitted by filament lamp impinge directly on reflector 104, a portion of electromagnetic radiation 112 does not impinge directly on reflector 104. Illumination system 100 further includes an additional reflector 114 constructed and arranged to reflect at least part of the portion of electromagnetic radiation 112 that does not impinge directly on reflector 104 toward reflector 104 through first focal point 106. Since a filament of filament lamp 102 already occupies first focal point 106, however, the filament of filament lamp 102 substantially blocks electromagnetic radiation 112. The filament of filament lamp 102 will thus absorb some of electromagnetic radiation 112. The portion of electromagnetic radiation 112 that is absorbed by the filament of filament lamp 102 may heat the filament of filament lamp 102, raising its temperature. A higher temperature results in an increased light output, which may be on the order of 30%.

Figure 2:
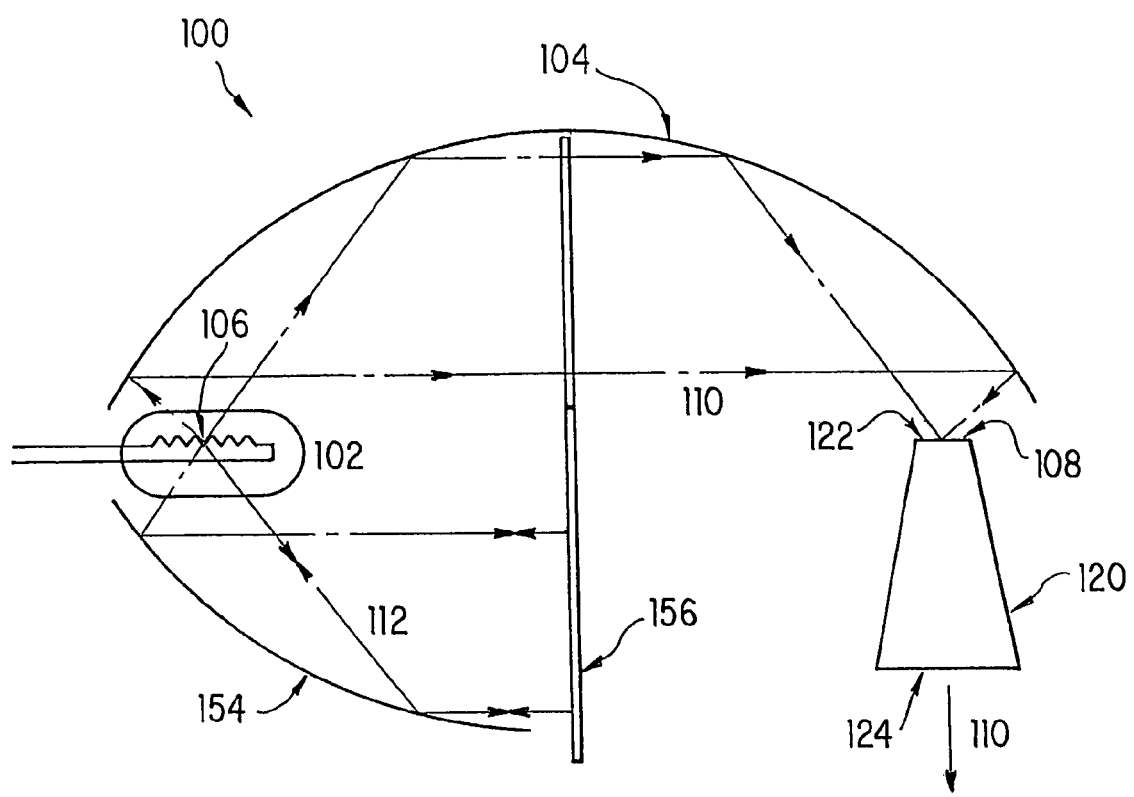
FIG. 2 is a schematic diagram of an illumination system according to an alternative embodiment of the invention.

Additional reflector 114 may be, e.g. a spherical retro-reflector disposed on a side of filament lamp 102 opposite reflector 104 to reflect electromagnetic radiation 112 emitted from filament lamp 102 toward reflector 104 through first focal point 106. In an alternative embodiment, shown in FIG. 2, additional reflector 114 may be a combination of a parabolic reflector 154 and a planar mirror 156. In a further alternative embodiment, a full circular parabolic reflector could be used.

In one embodiment, reflector 104 has a coating 116 that reflects substantially only a pre-specified portion 118 of a spectrum of electromagnetic radiation 110. Pre-specified portion 118 may be, e.g. visible light radiation, ultraviolet (UV) radiation, infrared (IR) radiation, a pre-specified band of wavelengths of radiation, or a specific color of radiation.

Figure 3:
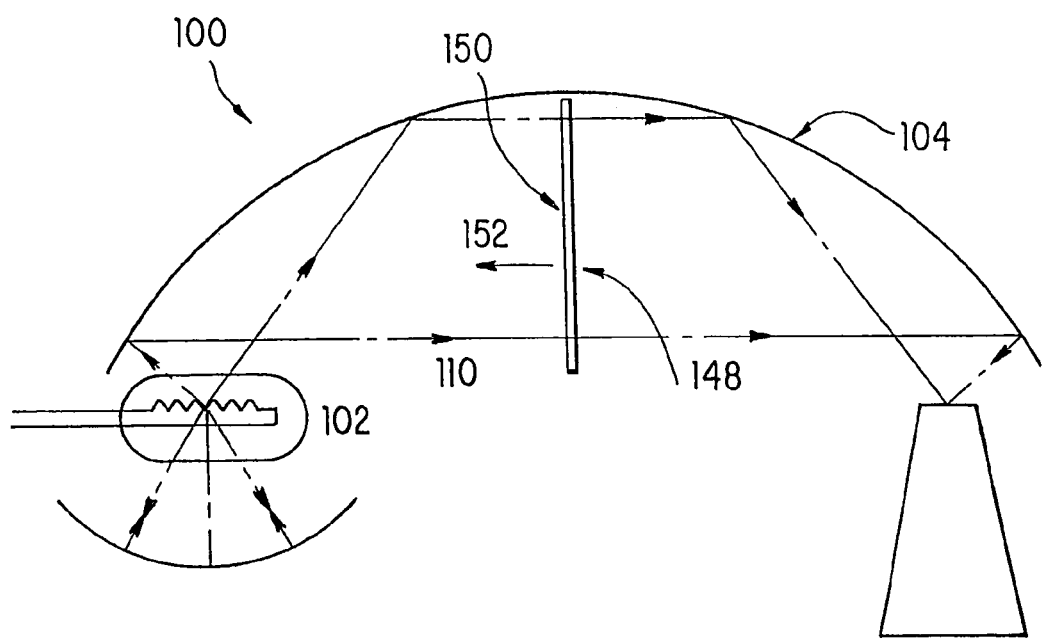
FIG. 3 is a schematic diagram of an illumination system according to a third embodiment of the invention.

In a third embodiment, shown in FIG. 3, illumination system 100 includes a filter 148 placed substantially in a path of rays of electromagnetic radiation 110. Filter 148 has a coating 150 that reflects substantially only a pre-specified portion 152 of a spectrum of electromagnetic radiation 110. In an alternative embodiment, coating 150 transmits substantially only a pre-specified portion 152 of a spectrum of electromagnetic radiation 110. In either embodiment, pre-specified portion 152 may be, e.g. visible light radiation, ultraviolet radiation, infrared radiation, a pre-specified band of wavelengths of radiation, or a specific color of radiation.

In a preferred embodiment, filter 148 reflects ultraviolet radiation and infrared radiation back to first focal point 106, while transmitting visible radiation toward second focal point 108. This would be the case if, e.g. visible light was to be launched into an output device, but not ultraviolet radiation or infrared radiation. The infrared and ultraviolet radiation reflected by filter 148 can thus be refocused onto the filament of filament lamp 102, heating the filament further to produce more light. As a result, more of the infrared and ultraviolet radiation would be trapped inside the reflector 104 and used for heating the filament of the filament lamp 102, thus increasing the efficiency of the system 100. The ultraviolet radiation and infrared radiation which would otherwise be wasted would thus be re-used. In a further alternative embodiment, one half of filter 148 could be a reflector and the other half a filter coated with a coating such as, e.g. coating 150.

In a preferred embodiment, illumination system 100 includes an output light pipe 120 having an input surface 122 and an output surface 124. Input surface 122 may be located proximate to second focal point 108 to collect substantially all of radiation 110. Radiation 110 passes through output light pipe 120 and may be transmitted substantially by output surface 124. Output light pipe 120 may be composed of, e.g. a material such as quartz, glass, plastic, or acrylic. Output light pipe 120 may be, e.g. a homogenizer, a tapered light pipe, or a straight light pipe. Output light pipe 120 may have, e.g. a cross-section such as a rectangle, a circle, a triangle, a trapezoid, a rhombus, a pentagon, a hexagon, or an octagon.

Figure 4:
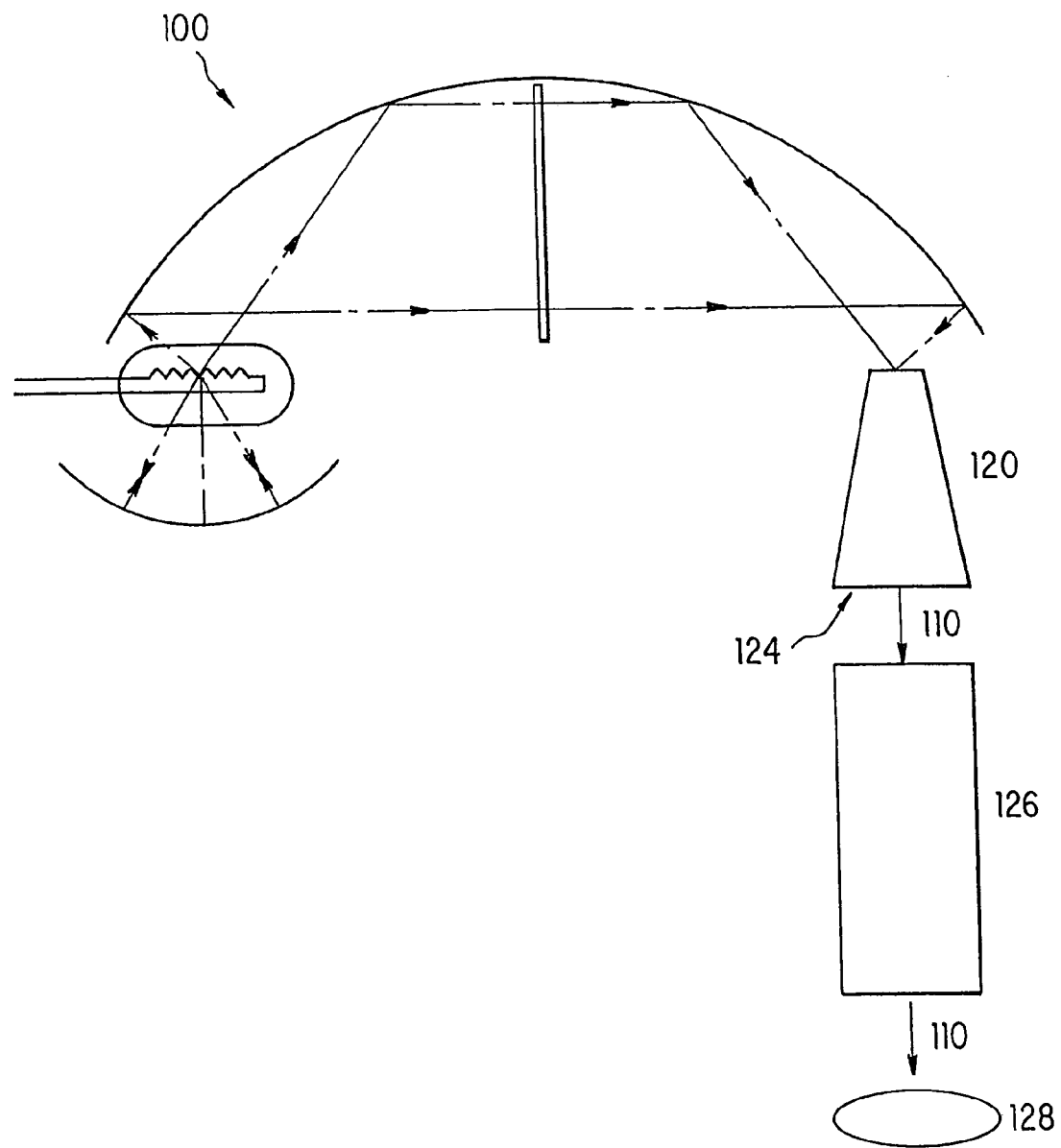
FIG. 4 is a schematic diagram of an illumination system according to a fourth embodiment of the invention.

In a fourth embodiment, shown in FIG. 4, illumination system 100 may include further a fiber optic 126, which may be illuminated substantially by radiation 110 transmitted at output surface 124 of output light pipe 120, after which fiber optic 126 releases collected radiation 110 to provide for illumination at a desired location 128.

Figure 5:
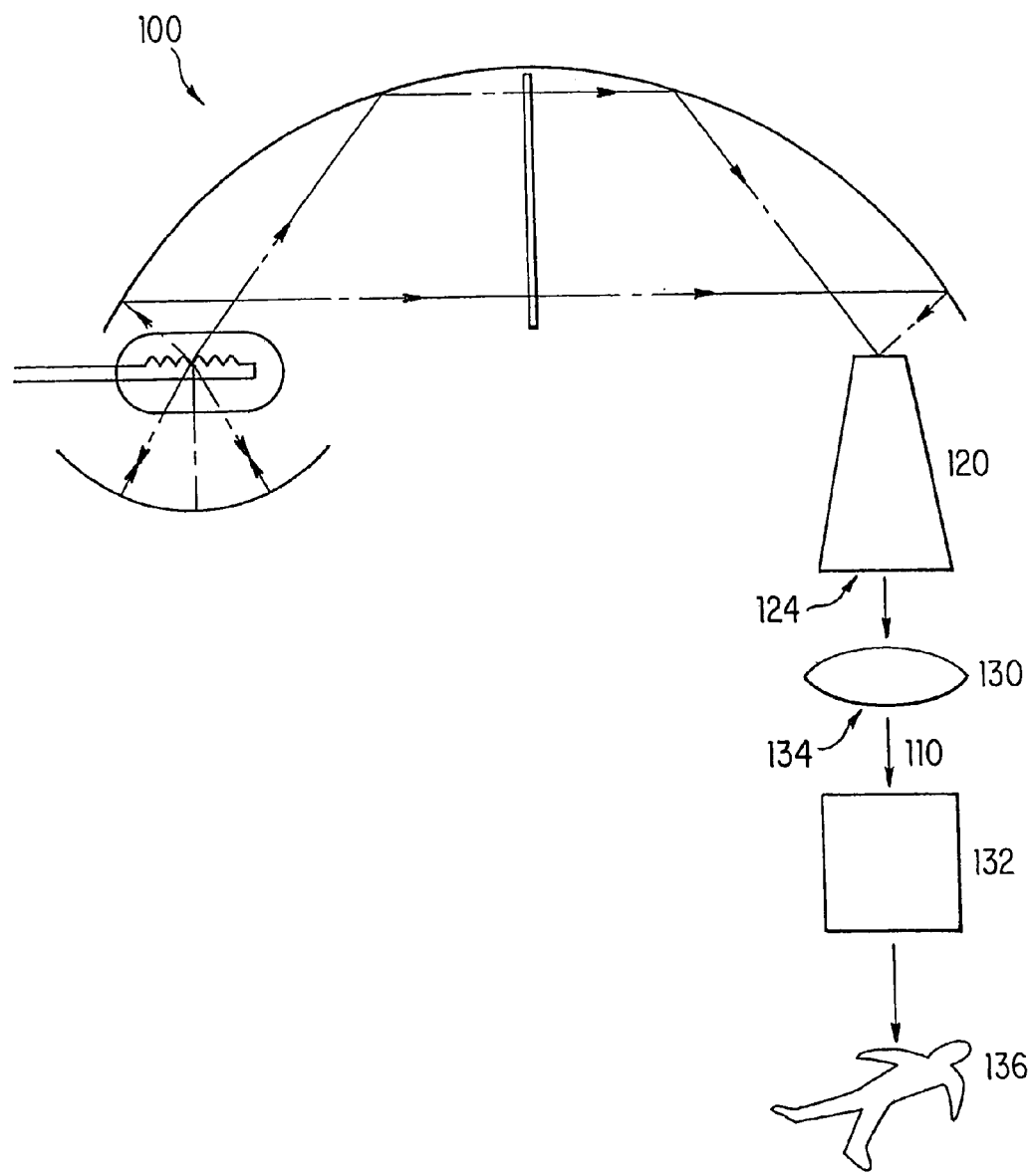
FIG. 5 is a schematic diagram of an illumination system according to a fifth embodiment of the invention.

In a fifth embodiment, shown in FIG. 5, illumination system 100 may include further a condenser lens 130 disposed substantially proximate to output surface 124 of output light pipe 120. An image projection system 132 disposed substantially proximate to an output side 134 of condenser lens 130 releases radiation 110 collected and condensed by condenser lens 130 to display an image 136.

Figure 6:
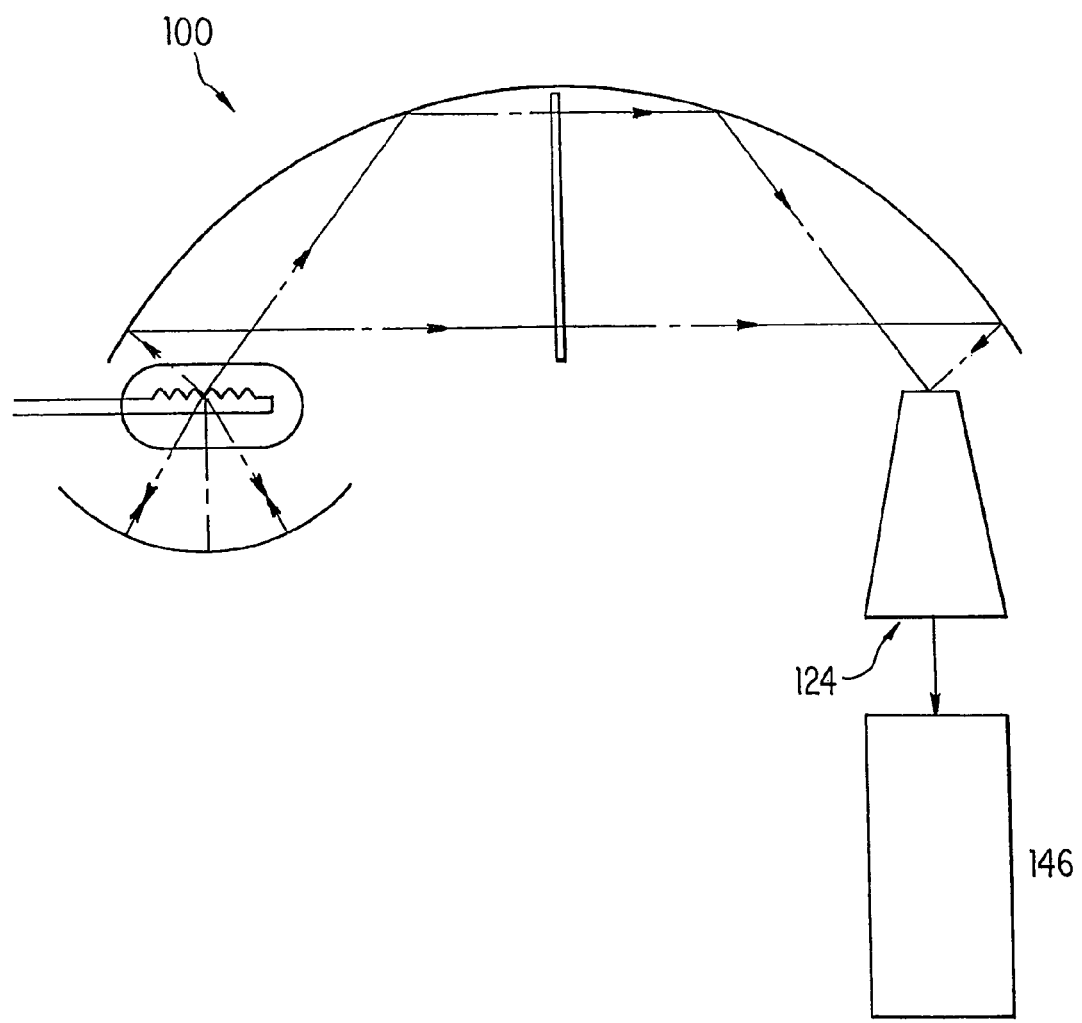
FIG. 6 is a schematic diagram of an illumination system according to a sixth embodiment of the invention.

In an sixth embodiment, shown in FIG. 6, illumination system 100 includes a waveguide 146 disposed substantially proximate to output surface 124. Waveguide 146 may be, e.g. a single core optic fiber, a fiber bundle, a fused fiber bundle, a polygonal rod, or a hollow reflective light pipe. Waveguide 146 may further be, e.g. a circular waveguide, a polygonal waveguide, a tapered waveguide, or a combination thereof. Waveguide 146 may be composed of, e.g. a material such as quartz, glass, plastic, or acrylic.

Figure 7:
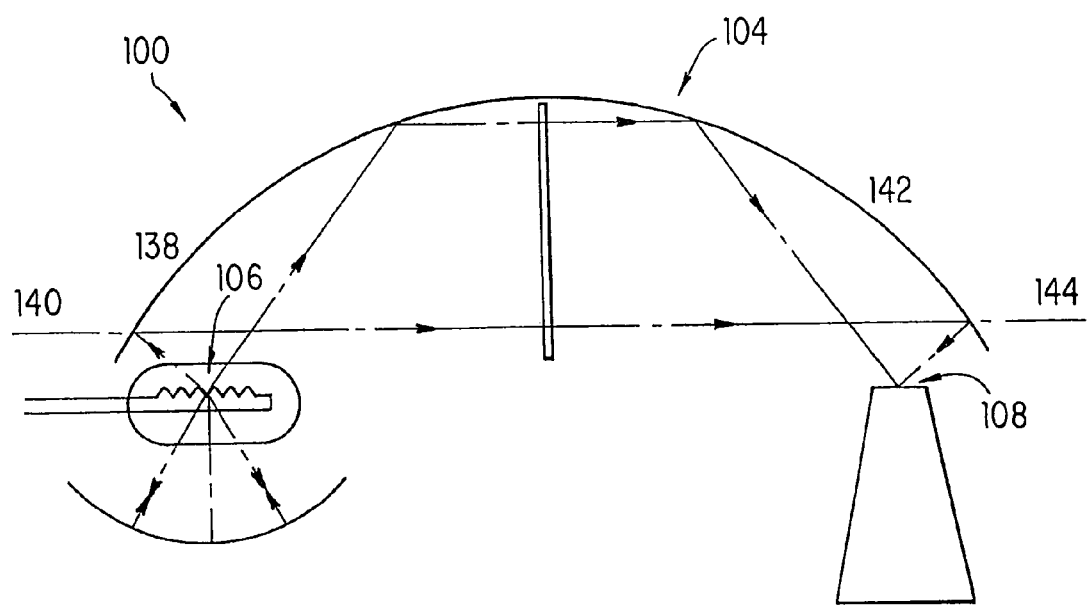
FIG. 7 is a schematic diagram of an illumination system according to a seventh embodiment of the invention.

In a seventh embodiment, shown in FIG. 7, reflector 104 of illumination system 100 comprises a first reflector 138 having a first optical axis 140 and a second reflector 142 having a second optical axis 144. Second reflector 142 may be placed substantially symmetrically to first reflector 138 such that first and second optical axes 140, 144 are substantially collinear. In this embodiment first focal point 106 may be a focal point of first reflector 138 and second focal point 108 may be a focal point of second reflector 142.

In one embodiment, first and second reflectors 138, 142 may each be, e.g. at least a portion of a substantially toric surface of revolution. In another embodiment, first and second reflectors 138, 142 may each be, e.g. at least a portion of a substantially spheroid surface of revolution.

In an alternative embodiment, first reflector 138 shown in FIG. 7 comprises at least a portion of a substantially ellipsoid surface of revolution, while second reflector 142 comprises at least a portion of a substantially hyperboloid surface of revolution. In a further alternative embodiment, first reflector 138 comprises at least a portion of a substantially hyperboloid surface of revolution, while second reflector 142 comprises at least a portion of a substantially ellipsoid surface of revolution. The advantages of these variations would be shown in certain systems where other factors might require that the shapes are different, or the lamp envelope needs to be compensated, or the target may be larger such that 1:1 imaging is not necessary.

Figure 8:
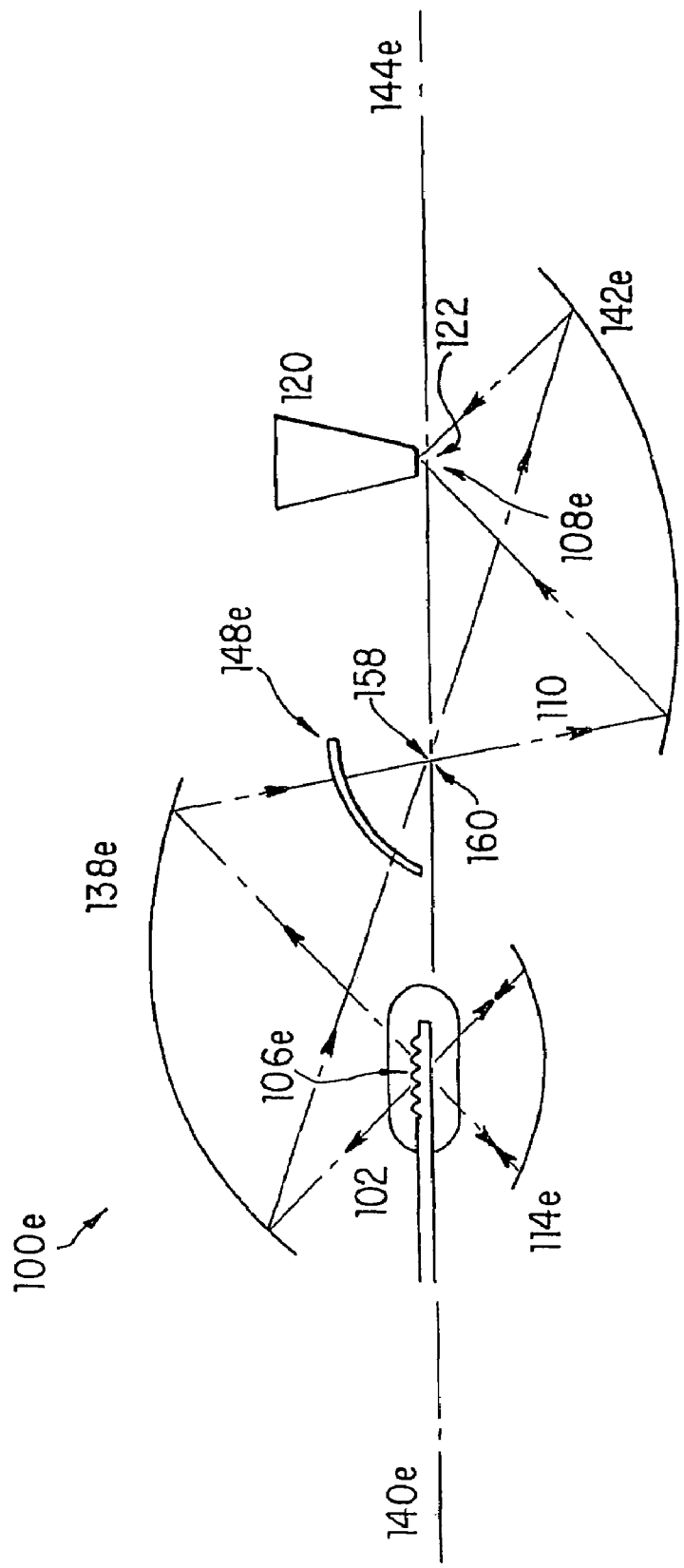
FIG. 8 is a schematic diagram of an illumination system according to an eighth embodiment of the invention.

In a eighth embodiment, shown in FIG. 8, first and second reflectors 138*e*, 142*e* may each be, e.g. at least a portion of a substantially ellipsoid surface of revolution. FIG. 8 shows an embodiment of illumination system 100e using two semi-circular elliptical mirrors 138*e* and 142*e* with substantially co-linear optical axes 140*e*, 144*e*.

The filament of filament lamp 102 may be placed at the focus 106*e* of elliptical reflector 138*e*. A spherical reflector 114*e* provides retro-reflection. A spherical filter 148*e* may be placed such that a center of curvature 158 of filter 148*e* coincides with a common focal point 160 of the two elliptical reflectors 138*e*, 142*e*. Infrared and ultraviolet radiation incident onto the filter 148*e* will be reflected back into itself along the same path back into the filament of filament lamp 102.

In one embodiment, elliptical reflectors 138*e*, 142*e* have substantially the same shape. In other embodiments, elliptical reflectors 138*e*, 142*e* might, e.g. have a different ellipticity such that the projected image may be close to 1:1.

In a further embodiment, input surface 122 of output light pipe 120 may be placed at second focus 108*e* of second elliptical reflector 142*e* for collecting and transforming a numerical aperture (NA) of electromagnetic radiation 110 into, e.g. a lower NA.

Figure 9:
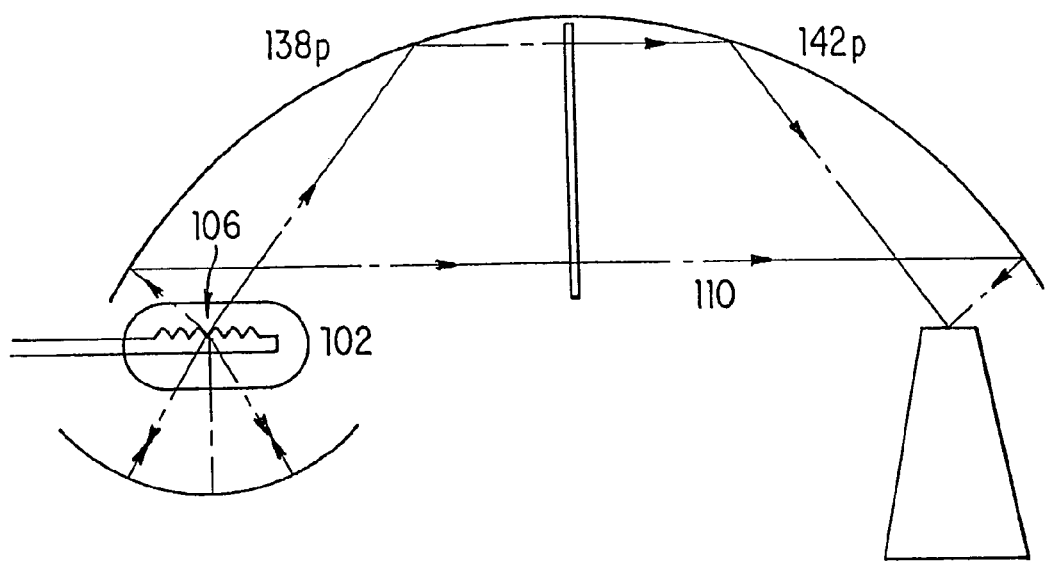
FIG. 9 is a schematic diagram of an illumination system according to a ninth embodiment of the invention.

In an ninth embodiment, shown in FIG. 9, first and second reflectors 138*p*, 142*p* may each be, e.g. at least a portion of a substantially paraboloid surface of revolution. Rays of radiation 110 collected by parabolic reflector 138*p* may be collimated into parabolic reflector 142*p*. The parabolic reflector 142*p* may be placed substantially symmetrically opposite parabolic reflector 138*p*, thus producing an image of the filament of filament lamp 102 at first focal point 106 of parabolic reflector 138*p* with a substantially unit magnification for all angles of light and preserving the brightness of the filament.

In a tenth embodiment, a method of illumination comprises the steps of positioning a filament lamp 102 at a first focal point 106 of a reflector 104, producing rays of radiation 110 by filament lamp 102, reflecting a portion of rays of radiation 110 by reflector 104 toward a second focal point 108 of reflector 104, converging rays of radiation 110 at second focal point 108 of second reflector 104, reflecting at least part of a portion of rays of radiation 110 that do not impinge directly on reflector 104 toward reflector 104 through first focal point 106 of reflector 104, positioning an output light pipe 120 having an input surface 122 and output surface 124 so input surface 122 may be substantially proximate to second focal point 108, collecting rays of radiation at input surface 122, passing rays of radiation 110 through output light pipe 120, and outputting rays of radiation 110 from output surface 124 of output light pipe 120.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. An illumination system using filament lamps comprising:
    a first reflector comprising a first reflector portion with a first focal point, and second reflector portion with a second focal point;
    a filament lamp comprising a filament, disposed proximate to said first focal point of said first reflector, for emitting rays of electromagnetic radiation that reflect from said first reflector portion and said second reflector portion to converge substantially at said second focal point of said second reflector portion;
    a second reflector arranged to reflect at least part of a portion of the electromagnetic radiation that does not impinge directly on said first reflector toward said filament lamp; and
    wherein said filament substantially blocks and absorbs said portion of the electromagnetic radiation, thereby heating said filament of said filament lamp to increase said electromagnetic radiation output of said filament lamp.

2. The illumination system of claim 1, wherein said second reflector comprises a spherical retro-reflector disposed on a side of said filament lamp opposite said first reflector to reflect electromagnetic radiation emitted from said filament lamp received towards said first reflector.

3. The illumination system of claim 1, wherein said second reflector comprises a paraboloid retro-reflector and a flat reflector and wherein said paraboloid retro-reflector being disposed on a side of said filament lamp opposite said first reflector to reflect electromagnetic radiation emitted from said filament lamp reflector towards said flat reflector, which reflects said electromagnetic radiation towards said paraboloid retro-reflector.

4. The illumination system of claim 1, further comprising a waveguide disposed substantially proximate to said second focal point to substantially collect all of said radiation.

5. The illumination system of claim 4, wherein said waveguide is selected from the group consisting of circular waveguides, polygonal waveguides, tapered waveguides and combinations thereof.

6. The illumination system of claim 1, comprising further a filter placed substantially in a path of said rays of electromagnetic radiation.

7. The illumination system of claim 6, wherein said filter reflects a pre-specified portion of a spectrum of the electromagnetic radiation towards said filament lamp which is absorbed by said filament of said filament lamp.

8. The illumination system of claim 6, wherein said filter reflects ultraviolet and infrared radiation towards said filament lamp which is absorbed by said filament of said filament lamp.

9. The illumination system of claim 7, wherein said portions of the electromagnetic radiation heats said filament of said filament lamp.

10. The illumination system of claim 1, wherein said portions of the electromagnetic radiation heats said filament of said filament lamp to increase temperature of said filament, thereby increasing said electromagnetic radiation output of said filament lamp.

11. The illumination system of claim 1, wherein said first reflector is coated to reflect only a pre-specified portion of a spectrum of the electromagnetic radiation.

* * * * *